United States Patent
Lim et al.

(10) Patent No.: US 6,348,429 B1
(45) Date of Patent: Feb. 19, 2002

(54) POLYMERS FROM VINYLIC MONOMER(S) PEROXIDES AND AMINES

(75) Inventors: Drahoslav Lim, San Diego; David Arthur Gough, Cardiff; Andrea M. Rourke, Newbury Park, all of CA (US)

(73) Assignee: The Regents of the University of California, Oakland, CA (US)

( * ) Notice: Subject to any disclaimer, the term of this patent is extended or adjusted under 35 U.S.C. 154(b) by 1451 days.

(21) Appl. No.: 08/688,242

(22) Filed: Jul. 29, 1996

Related U.S. Application Data

(63) Continuation of application No. 08/236,974, filed on May 2, 1994, now abandoned.

(51) Int. Cl.⁷ ................................................. C08F 4/00
(52) U.S. Cl. ........................ 502/160; 502/159; 502/167; 525/379; 525/387
(58) Field of Search ................................. 502/159, 160, 502/167; 525/190, 387, 418, 379

(56) References Cited

U.S. PATENT DOCUMENTS

| | | | |
|---|---|---|---|
| 2,744,886 A | * | 5/1956 | Protzman |
| 4,093,573 A | | 6/1978 | Ramlow et al. |
| 4,299,942 A | * | 11/1981 | Piestert .................... 526/323.1 |
| 4,404,237 A | | 9/1983 | Eichelberger et al. |
| 4,910,259 A | | 3/1990 | Kindt-Larsen et al. |

OTHER PUBLICATIONS

Studies on the Polymerization of Functional Monomers Containing Amino Groups. V. Synthesis of 4–N,N–Dimethylaminostyrene and Its Used as a Component of The Redox Initiation System Polymer Communications, Oct. 1983.

Argentar, et al "An Amine Accelerator for Colorfree Curing of Cold–Curing Methyl Methacrylate Denture Systems" JADA, vol. 102, May 1981.

Buss et al., An Improved Method for Embedding Hard Tissue in Poly Methyl Methacrylate, Stain Technol. 58(3) 1983 pp. 135–142.

Brauer et al., "Dependence of Curing Time, Peak Temperature, and Mechanical Properties on the Composition of Bone Cement", *Journal of Biomedical Materials Research*, vol. 20, 839–852 (1986).

Brauer et al., "4–N, N–Dialkylaminophenethanols,—Alkanoic Acids and Esters: New Accelerators for Dental Composities", *J Dent Res*, 60(7): 1343–1348, Jul. 1981.

Connelly et al., "The Role of Porosity in the Shrinkage of Acrylic Bone Cement", *The 13th Annual Meeting of the Society for Biomaterials*, p. 114, Jun. 2–6, 1987.

Horner et al., "Der Serfall von Dibenzoylperoxyd durch substituierte tertiare Amine", *Ann Chemie*, 573135 (1951).

Jones et al., "Cement Disease", *Clinical Orthopedics*, 225:192–206 (1987).

Seidel et al., "Neuentwicklung eines Quelbaren Knochenzementes", *Aktuelle Probleme Chir. Orthop.* 31: 354–357 (1987).

* cited by examiner

*Primary Examiner*—Christopher Henderson
(74) *Attorney, Agent, or Firm*—Fulbright & Jaworski L.L.P.

(57) ABSTRACT

Cement compositions including initiation systems containing at least one peroxide or amine which has a higher molecular weight than the heretofore-employed peroxide BPO and amine DMpT, respectively. In particular, derivatives of peroxides and amines bearing large substituents relative to BPO and DMpT and polymeric peroxides and amines are suitably employed in the reaction mixture. Through the use of these initiator systems in which one or more of the components has reduced mobility relative to the materials employed in the conventional mixtures, it is possible to control the exothermicity and the peak temperature of the polymerization, while nonetheless achieving timely and adequate polymerization of the material. Concurrently, the choice of components for use in the initiation system advantageously results in a reduction in the generation of waste products and in the potential toxicity of the composition. In general, initiators having structures with substituents attached to the benzoyl peroxide or the amine skeleton and equivalent to at least about 4 additional carbon atoms are preferred. Porosity and shrinkage of cement products are addressed through selection of appropriate comonomers for use with or in place of methyl methacrylate. Hydrophilic comonomers and/or monomers with lower vapor tension than methyl methacrylate are preferred for this purpose. These modifications are broadly useful in a wide variety of vinyl-based polymerization systems, including but not limited to those used in biomedical applications.

13 Claims, No Drawings

POLYMERS FROM VINYLIC MONOMER(S) PEROXIDES AND AMINES

This application is a file wrapper continuation of U.S. patent application Ser. No. 08/236,974, filed on May 2, 1994, now abandoned.

BACKGROUND OF THE INVENTION

The present invention relates generally to the fields of polymer chemistry and medicine. More particularly, the present invention is directed to self-curing acrylic-or vinyl-based cements particularly suitable for orthopedic, dental and other applications, as well as methods for the preparation and use thereof.

Self-curing cements are based on the discovery many decades ago that polymerization of monomers initiated by diacyl-peroxides and a tertiary amine proceeds at much lower temperatures than polymerizations initiated by thermal decomposition of the peroxides only. The amine reacts with the peroxide in the monomer medium at ambient temperature, resulting in the formation of free radical intermediates which initiate the polymerization.

This mode of polymerization was first generally employed in products for use in dentistry. For practical, functional and safety reasons, the monomer used was methyl methacrylate. Polymerization was frequently effected in the presence of polymethyl methacrylate powder; the polymer powder (which is soluble in the monomer) was used to thicken the monomer mixture with its own polymer product to form a dough which was easily moldable at ambient temperatures into various complex shapes otherwise difficult to attain by standard polymer processing methods. Another reason for addition of the polymer powder to the monomer was to lower the shrinkage that occurs to a significant extent during any vinyl polymerization. Finally, addition of the polymer to the monomer lowered the considerable heat of polymerization, minimizing the porosity of cast articles due to overheating of the polymerizing system above the boiling point of the monomer.

For use in dentistry, acrylic cements had been developed for casting of dentures, tooth caps, bridges, etc. The cements consisted essentially of methyl methacrylate (MMA), benzoyl peroxide (BPO), dimethyl-p-toluidine (DMpT) and polymethyl methacrylate (PMMA). The ingredients were mixed in appropriate amounts to form a dough which was then processed into a final rigid shape. Notwithstanding their widespread usage, these cement compositions had several significant shortcomings. In particular, the amines present in the compositions resulted in coloration of the resultant products, which is especially unwelcome in dentistry where attaining of natural color of teeth is an important consideration.

These acrylic-based cement compositions were subsequently employed in orthopedic surgery, primarily for fixation of artificial joints in hip replacements to fill the void between the cavity in the bone and the artificial hip inserted into the cavity. The use of acrylic cements in orthopedic surgery poses the most demanding requirements on these materials, particularly with respect to biocompatibility of both the precursor compositions and final products.

These cements have significant shortcomings with respect to their suitability for use in both dentistry and orthopedic surgery. For many dental applications, however, some of these shortcomings may be of lesser importance because all processing prior to final application is done external to the body. One shortcoming of particular concern in orthopedic uses is the toxicity of the cements, resulting from toxic initiation compounds used, toxic reaction products formed therefrom and residual monomer remaining after incomplete polymerization. Another shortcoming is the shrinkage of the cement during the setting, which can result in loosening of the fixation of the artificial hip. A third deficiency is the porosity of the acrylic cement products, resulting in part from the mixing technique and in part from formation of bubbles due to overheating in microregions of the polymer bulk; this porosity decreases the mechanical properties of the product cements. Finally, polymerization of the setting cement at temperatures well above body temperature damages bone tissue. Any or all of these factors may contribute to shortened lifetime of a joint replacement.

Even after many years of experience and research since the introduction of orthopedic cements, there have been no innovations of significance which would satisfactorily remedy all of the deficiencies encountered with the heretofore-known compositions. Accordingly, there remains a need in the art for improved acrylic-based cement compositions, particularly for biomedical or other applications.

It is an object of the present invention to provide improved acrylic-based compositions and methods for the preparation and use thereof which do not suffer from the drawbacks attendant to the prior art compositions and methods.

It is a particular object of the present invention to provide acrylic-based cement compositions and methods for the preparation and use thereof in which there is the possibility of greater control of polymerization in all stages up to completion.

It is a further object of the present invention to provide acrylic-based compositions for use in particular in biomedical applications which do not require major modifications in current techniques, such as mixing and insertion methods.

SUMMARY OF THE INVENTION

In accordance with one aspect of the present invention, initiation systems are provided comprising at least one peroxide or amine which has a higher molecular weight than the heretofore-employed peroxide BPO and amine DMpT, respectively. In particular, derivatives of peroxides and amines bearing large substituents relative to BPO and DMpT and polymeric peroxides and amines are suitably employed in the reaction mixture. Through the use of these initiator systems in which one or more of the components has reduced mobility relative to the materials employed in the conventional mixtures, it is possible to control the exothermicity and the peak temperature of the polymerization, while nonetheless achieving timely and adequate polymerization of the material. Concurrently, the choice of components for use in the initiation system advantageously results in a reduction in the generation of waste products and in the potential toxicity of the composition. In general, initiators with substituents attached to the benzoyl peroxide or the amine skeleton and equivalent to at least about 4 additional carbon atoms are preferred.

In accordance with another aspect of the invention, porosity and shrinkage of the cement products are addressed through selection of appropriate comonomer mixtures. In accordance with one embodiment, hydrophilic comonomers are employed under suitable copolymerization parameters which lead to formation of a random copolymer. This type of copolymer allows water to diffuse slowly through the matrix, swelling the material slightly to compensate for shrinkage, but without non-uniform softening of the matrix which might significantly compromise the mechanical strength. In accordance with another aspect of this embodiment of the invention, monomers with lower vapor tension than methyl methacrylate are used as comonomers (optionally, in combination with the hydrophilic comonomers) in order to reduce the formation of pores. These monomers are chosen such that the boiling point of the reaction mixture is increased but the alkyl ester chain length does not significantly alter the properties of the final polymer. Use of these monomers further makes it possible to achieve a more substantial degassing of the reaction mixture, thereby also reducing pore formation during the mixing process.

DETAILED DESCRIPTION OF THE INVENTION

Pursuant to one aspect of the present invention, alternative initiation systems are provided in order to eliminate various disadvantages of the conventional BPO/DMpT system. In these improved initiation systems, higher molecular weight amines and/or peroxides are employed. These compounds do not diffuse as easily as BPO and DMpT out of the cement (for example, into the surrounding tissue when used in biomedical applications), and thus these compounds and their reaction products are less likely to be extracted out of the cured cement. Moreover, the decrease of mobility results in a relative decrease in the rate of formation of intermediate products with each other, rather than reacting with the monomers.

To improve the initiation efficiency and to reduce the side-product formation characteristic of the heretofore-employed BPO/DMpT initiation system, the improved initiation systems of the present invention are characterized by containing at least one peroxide or amine which has a higher molecular weight than the corresponding conventional material.

The modified initiation systems of the invention are particularly suitable for use in orthopedic materials. Of course, as would be readily apparent to those working in the field, these initiators may be employed in most vinyl-based polymerization systems (i.e., systems wherein the polymerizable group is a vinyl group). For example, with a suitable selection of monomers and polymers, the initiation systems of the invention are particularly suitable for dental and other biomedical uses. In addition, the initiation systems of the invention have a wide applicability in non-biomedical vinyl-based polymerizations.

Use of these improved initiator systems enables one to slow down the very fast steps of the primary reaction of both components, which is not initiation; initiation is only a minor side reaction, as evidenced by the excess amount of initiator used in polymerization by this system. The result of this reduction in rate of reaction of both components in the presence of monomer is an increase of rate of initiation. The novel initiator compounds employed have reduced mobility, as do the resulting intermediates in the sequence of mutual reactions, while their reactivity with monomer remains basically unaffected. This results in a relative increase in the reaction rate of the intermediates with monomer.

A wide variety of peroxides with an increased molecular weight relative to benzoyl peroxide may be employed in accordance with this aspect of the present invention. As would be expected, the variety in structures of these peroxides is reflected in a corresponding variation in decomposition rates. This variation in decomposition rates may advantageously be exploited to provide control over the rate and duration of the polymerization process.

One class of peroxides suitable for use in accordance with the present invention are aromatic diacyl peroxides wherein each aromatic acyl group comprises substituents equivalent to at least about 4 additional carbon atoms, and preferably at least about 8 additional carbon atoms, relative to the phenyl group of benzoyl peroxide. Exemplary peroxides of this type include substituted derivatives of benzoyl peroxide. Suitable substituents equivalent to at least about 4 carbon atoms (or structures providing additional carbon atoms relative to the phenyl group of benzoyl peroxide) include, but are not limited to, the following: alkyl; aryl, such as naphthyl [e.g., di(1-naphthoyl)peroxide]; aralkyl, such as phenylalkyl or naphthylalkyl; and (aralkyl)aryl, such as (phenylalkyl)aryl. Another suitable class of peroxides is long-chain diacyl peroxides, including straight-chain or branched alkyl or substituted cycloalkyl comprising at least about 10 carbon atoms, and preferably about 12 carbon atoms (e.g., dilauroyl-peroxide). Each of these substituents may be unsubstituted or substituted by one or more non-interfering substituents. By a non-interfering substituent is meant a substituent which does not have a detrimental impact on the course of the polymerization reaction or on the properties of the final product. Exemplary non-interfering substituents include, but are not limited to, the following: alkyl, alkoxy, amide, ester, etc. By a substituent equivalent to at least about 4 carbon atoms is meant a group comprising a sufficient number of carbon and hydrogen atoms, and optionally heteroatoms (such as oxygen and nitrogen), such that the molecular weight of the substituent is comparable to the molecular weight of 4 carbon atoms; similar reasoning would apply with respect to substituents equivalent to about 8, about 10 and about 12 carbon atoms. As would be appreciated by those skilled in the art, peroxides of this type are either known compounds or may routinely be prepared by well known synthetic procedures. In general, these peroxides may be prepared, for example, by reaction of the corresponding acid chlorides with sodium peroxide or NaOH/$H_2O_2$.

As exemplifications of this embodiment, three novel aromatic di(acyl) peroxides were evaluated for use in amine/peroxide initiation systems. Relative to benzoic acid (the decomposition product of BPO), the acidic products from decomposition of these peroxides are much less extractable from the cured material. Moreover, the three peroxides have structures which result in very different rates of reaction with amines. Bis(2-phenethyl)benzoyl peroxide is substituted in the ortho-position with a phenethyl group; substitution in this position results in an accelerated rate of reaction with amines relative to BPO. Benzoyl peroxide substituted with a phenethyl group in the para-position is less soluble in the monomer and initiates polymerization slower than BPO, but retains initiation capability for a long time. Finally, bis(p-octyl)benzoyl peroxide is quite soluble in the monomer and initiates slightly more slowly than BPO.

Another class of suitable peroxides includes polydiacyl peroxides, such as polyperphthaloyl peroxide and polyacroylbenzoyl peroxide. Such polydiacyl peroxides may be prepared, e.g., from phthaloyl chloride or by reaction of polyacroyl chloride with perbenzoic acid.

In accordance with another aspect of the invention, monomeric and polymeric amines analogous in structure to DMpT but having a higher molecular weight are employed as accelerators in embodiments of the improved initiator compositions of the present invention. For use as accelerators or promoters in the alternative initiation systems of the present invention, tertiary dialkylarylamines with a substituent on the aryl group equivalent at least to about 4 carbon atoms, preferably at least about 8 carbon atoms, or diamines or polyamines having increased molecular weights relative to DMpT are suitably employed.

In one preferred embodiment, amine dimers comprising two amino-substituted aromatic rings connected together with suitable linkage groups are employed. These diamines react with the peroxide in a manner similar to DMpT, but require half the molar quantity; because of better overall efficiency of initiation of these systems over BPO-DMpT, lower amounts of initiator components can be used, reducing the amount of residual free amine in the final cured product. In addition, the large diamine molecules and their products are less easily extractable from the polymer matrix and are more likely to be chemically incorporated into the polymer to a greater extent than DMpT.

Illustrative of this approach, two dimeric analogs of N,N-dimethyl-p-toluidine were employed as amine accelerators. One of these amines, bisdimethylamino-dibenzyl, has a short chain spacer between the para-positions of the aromatic rings. A second amine, 1,10-decanedicarboxylic acid, bis 4-(N,N-dimethylamino)phenethyl ester, was synthesized from the readily-available starting materials dodecanedioyl dichloride and 4-(N,N-dimethylamino) phenethanol. This dimer of a tertiary aromatic amine was designed with a long chain spacer between the amines, so that both the accelerator and its products from reaction with peroxide are far less likely to be extracted from the polymer network.

In general, aromatic diamines comprising spacers equivalent in length or molecular size to carbon chains of one to about 40 carbon atoms are suitable for use in accordance with this embodiment of the present invention. These spacers may contain heteroatoms (such as nitrogen and oxygen) in the spacer chain. In addition, the spacers may be unsubstituted or substituted by one or more non-interfering substituents as previously defined.

In another preferred embodiment, amine accelerators which serve as comonomers in the polymerization process are employed. These monomeric compounds are designed to be incorporated into the polymerizing chains, greatly decreasing the free amine content of the cured cement. As an example of this approach, 4-(N,N-dimethylamino) phenethanol was methacrylated to form a monomeric amine accelerator which participates in the initiation reaction and is then incorporated into the polymer chains. Suitable amines for forming such a monomer typically comprise an aromatic structure (such as phenyl or naphthyl), at least one dialkyl-substituted amino group and a reactive group for introduction of the polymerizable elements. Exemplary amines for this purpose include, but are not limited to, the following: o-, m- and p-hydroxyalkyldi(lower-alkyl)aniline; o-, m- and p-carboxyalkyldi(lower-alkyl)aniline; and o-, m- and p-aminoalkyldi(lower-alkyl)aniline, in which the alkyl group may be from 1 to about 12 carbon atoms and lower alkyl is from one to about 5 carbons (and preferably, methyl or ethyl). Suitable polymerizable elements which may be readily introduced into the accelerator monomer by reaction with the amine include, but are not limited to, acroyl and methacroyl groups (into hydroxy and amino compounds) and acroylalkyloxy and methacroylalkyloxy groups (into carboxy derivatives).

In yet another preferred embodiment, polymeric amine compounds which either are soluble in the monomer or can be admixed as part of polymer powder are employed to eliminate entirely the presence of free low-molecular-weight amine in the material. Polymeric amines are particularly suitable for use in acrylic orthopedic materials, because they significantly reduce the peak temperature without altering the working time or compromising the mechanical strength. In general, the polymeric amines comprise copolymers of suitable amine-containing dialkylarylamine monomers with appropriate acrylic or acrylic-compatible comonomers are employed as accelerators. For example, 4-(N,N-dimethylamino)styrene and 4-(N,N-dimethylamino) phenethyl methacrylate may be utilized as comonomers with, e.g., methyl methacrylate in preparation of polymeric accelerator components of the initiation system of the present invention. Copolymers with a molecular weight in the range of about 1000 to about 20,000, preferably about 2,000 to about 5,000 and comprising a ratio of amine-containing monomer to comonomer in the range of about 1:1 to about 1:10, preferably about 1:2 to about 1:5, are suitably employed to obtain better solubility of the polymer in the liquid monomer component. Suitable amine-containing monomers for use in preparation of polymeric accelerators include those previously described as appropriate for use as monomers in the polymerization of the final product. In addition to methyl methacrylate, suitable comonomers in particular for biomedical applications include, but are not limited to, the following: styrenes, higher alkyl methacrylates and hydroxyalkyl methacrylates.

Pursuant to all of these approaches, there is the significant advantage that substantially-reduced amounts of toxic free amine are present in the cured polymers accelerated with these monomeric or polymeric amines. This is a result both of the lower initial amount of accelerator employed and of the better incorporation of these amines into the polymer.

In addition, the observed results permit the conclusion that products which adversely impact the course of polymerization may be formed in the amine/peroxide reaction, but a lower concentration of such deleterious by-products are produced when using higher-molecular-weight peroxides and/or amines. Evidence for this is found in the polymerizations initiated with poly[methyl methacrylate-co-4-(N,N-dimethylamino)styrene] (PMMADMAS) and BPO. The large polymer chains cannot diffuse as quickly through the slurry to react with the peroxide and the amine molecules are not free to participate in all reactions with BPO. Despite the limited molecular mobility of the amine, the polymerizations initiated with BPO and PMMADMAS had good conversion; this implies that fewer non-initiating reactions are occurring.

Instead of or in addition to using polymethyl methacrylate powder, copolymers of methyl methacrylate or other monomers compatible with the acrylic product with amine comonomers may be used as the part of the powder polymer component of the system. The amino groups of such polymers are utilized in initiation to the extent in which they come into contact with the peroxide.

The combination of peroxides and amines in the initiation system can be selected so as to control all phases of curing. This includes from the onset of polymerization over the flat exotherm of the main curing process up to the practical completion of polymerization (i.e., to 98% or higher completion). For less demanding purposes than orthopedic uses, use of only one component (e.g., the amine or the peroxide) with reduced mobility relative to BPO or DMpT may be sufficient to provide adequate control of polymerization; for orthopedic uses, it is presently preferred to use an initiation system comprising both peroxide and amine with reduced mobility.

Combinations of the amines and peroxides described herein are suitably used as initiation systems in accordance with the present invention to control the exotherm and peak temperature of polymerization. Polymerizations of methyl methacrylate (MMA) in bulk and of MMA/PMMA slurries were tested with various compositions of amine and peroxide to determine the peak temperature and time to peak temperature. These provided exotherm curves for each polymerization. The time vs. temperature data for the polymerization of MMA and MMA/PMMA slurries displayed trends of behavior for amine accelerators in the decomposition of aromatic diacyl peroxides and the subsequent initiation of polymerization. These trends enable the programming of polymerization initiation by selecting proper combination(s) of peroxide initiator(s) and amine accelerator(s) to provide the type of initiation desired without generation of substantial quantities of toxic waste products.

Initiation systems may be used in combination to provide custom initiation processes such as a fast initial start with sufficient periods of time for mixing, followed by a main polymerization proceeding with lower peak temperature but the capacity for continued polymerization to maximum conversion. For example, a fast decomposing peroxide with a highly reactive amine accelerator may be used to start the initiation process, but will exhaust quickly. Therefore, one may also add a more slowly decomposing peroxide and a less reactive amine accelerator (such as a polymeric amine) to extend the period of polymerization initiation and achieve more complete conversion while maintaining the peak polymerization temperature within a reasonable range.

In accordance with another aspect of the present invention, in addition to or instead of the customary methyl methacrylate monomer, higher boiling monomer components may be used in whole or in part in the acrylic monomer compositions of the invention. This makes possible complete degassing of the mix (for example, in the full vacuum of an aspirator) prior to application of the reaction mixture to its intended use. In this manner, it is possible to reduce or eliminate porosity arising from mixing, and further from vaporization of the monomer during polymerization in microregions of the bulk of the polymer due to overheating resulting from the basically adiabatically-proceeding polymerization. Monomers are chosen such that their boiling points lie well above the peak polymerization temperature of the process. In addition, the monomers are selected so that their incorporation into the product does not significantly compromise the mechanical strength of the resultant polymer. Ethyl methacrylate (bp=118–119° C.), n-propyl methacrylate (bp=140–141° C.), isopropyl methacrylate (bp=125–126° C.) and butyl methacrylate (bp=160–163° C.) are exemplary of monomers whose boiling points lie above that of methyl methacrylate (bp=100° C.) and are therefore less likely to vaporize during degassing under vacuum or during polymerization. The monomer composition will of course depend to a great extent upon the intended use of the polymer product. In general, these comonomers may suitably comprise up to 100%, and preferably about 20% to about 90%, of the monomer mixture without having a serious deleterious impact on the physical properties (in particular, on the mechanical strength) of the resulting polymeric materials.

In accordance with another aspect of the invention, hydrophilic comonomers are employed which are capable of fairly rapid hydration by body fluids in order to compensate for the shrinkage. A significant increase in volumetric shrinkage of acrylic materials upon polymerization accompanies a decrease in porosity. The incorporation of a hydrophilic component into acrylic orthopedic biomaterials allows the polymer network to uniformly absorb water, but does not cause the polymer to soften significantly upon hydration. Thus, the cement swells rather uniformly without imposing as much strain on the polymer matrix, as in the case when the hydrophilic polymer is added in the form of particles which are part of the polymer powder. One simple hydrophilic monomer useful for compensation of shrinkage is HEMA. A novel monomer—MHPrMA—has also been developed which imparts to the copolymer a higher rigidity in the hydrated state without compromising mechanical properties of the material.

The quantity and type of hydrophilic comonomers, in particular for orthopedic applications, are selected so that the final polymeric material will compensate for shrinkage, which may amount to about 5%. In general, the hydrophilic comonomer will comprise about 3% to about 70% of the monomer mixture, depending on the hydrophilic properties of monomers used. Exemplary hydroxyl-containing hydrophilic comonomers include, but are not limited to, the following: 2-hydroxyethyl methacrylate (HEMA), 4-hydroxybutyl methacrylate (4HBMA), and 1-methyl-2-hydroxypropyl methacrylate (MHPrMA, a novel monomer). MHPrMA was designed such that polymers comprising same would be sufficiently hydrophilic for the intended purpose, but would better retain the rigidity of the hydrated cement than softer hydrophilic components. Other hydrophilic comonomers suitable for use in accordance with the present invention include, but are not limited to, the following: N-methyl methacrylamide, diglycol monomethacrylate and morpholine-acrylamide.

The hydrophilic component may be also part of the polymer powder prepared, e.g., by copolymerization of methyl methacrylate with a suitable amount of HEMA. Further, a powder copolymer containing a hydrophilic component may be used in combination with a monomer mixture also containing a hydrophilic monomer. The final cured cements will exhibit similar hydration properties to those of cements prepared using monomer mixtures comprising hydrophilic monomer.

The water uptake of copolymers of these hydrophilic and higher boiling monomers was measured. Slurries of these comonomers and PMMA powder were prepared, the water uptake determined, and the compressive strength measured after hydration. The copolymers prepared with the hydrophilic/higher boiling comonomers and PMMA powder were determined to have sufficient water uptake capability for use as acrylic orthopedic materials. While the strengths of the hydrophilic copolymers are generally lower than that of MMA/PMMA, copolymer compositions containing the novel hydrophilic monomer (MHPrMA) and ethyl methacrylate or n-propyl methacrylate have strengths close to those with MMA and well above the minimum adopted by standard tests for acrylic cements (e.g., ASTM standards).

Compressive strength tests of the copolymeric formulations confirmed that it is possible to incorporate higher boiling and hydrophilic monomers to address the problems of monomer vaporization and polymerization shrinkage while retaining sufficient mechanical strength. A balance between the amount of loss of strength and compensation for shrinkage is ultimately struck to provide an ideal material for any particular use (for example, use as an orthopedic acrylic cement).

Pursuant to another aspect of the present invention, acrylic-based cement compositions suitable for a wide range of uses are provided. As would be readily appreciated by those skilled in the art, these compositions would in general comprise about 70 parts by weight to about 130 parts by weight monomer, about 0.3 parts to about 8 parts amine, and about 0.2 parts to about 5 parts peroxide based on the total weight of the composition. Because a range of different compounds of widely divergent structures (and hence, molecular weights) may be employed in accordance with the present invention, the amounts of amine and peroxide are reported for purposes of convenience in terms of the molecular weights of DMpT and BPO, respectively; the amounts of amine and peroxide used in accordance with the present invention are those which provide functionally-equivalent amounts of tertiary amino groups and peroxide groups, respectively. Preferably, these compositions comprise about 80 to about 120 parts by weight monomer, about 0.5 to about 4 parts by weight amine, and about 0.5 to about 4 parts by weight peroxide. Most preferably, and in particular for biomedical applications, these compositions comprise about 90 to about 110 parts by weight monomer, about 0.5 to about 3 parts by weight amine, and about 0.5 to about 3 parts by weight peroxide. Of course, as would be readily appreciated by those skilled in the art, these compositions may further comprise other components (such as colorants or other additives) as are customary in polymerization systems for any given end use. For example, for particular uses such as some biomedical applications it is customary to include about 20 to about 90 parts by weight, and preferably about 50 to about 75 parts by weight of a polymer component.

While the initiation systems of the present invention are particularly useful for acrylic or acrylic-based polymerizations (i.e., for use with monomer mixtures in which the sole or primary monomer is methyl methacrylate), it would be readily appreciated by those skilled in the art that peroxide/amine initiators have wide applicability to polymerization of other monomers and monomer mixtures as well. In particular, initiation systems which decreased mobility of at least one component would be useful in a wide variety of applications other than biomedical ones. Exemplary monomers in addition to the customary methyl methacrylate include, but are not limited to, the following: higher alkyl methacrylates, wherein the alkyl group comprises 2 to about 12 carbon atoms; chloroalkyl acrylates and methacrylates, wherein the alkyl group comprises 1 to about 12 carbon atoms; higher alkyl acrylates, wherein the alkyl group comprises 2 to about 8 carbon atoms; alkyl and dialkyl acrylamides, wherein the alkyl group comprises 1 to about 12 carbon atoms; monosubstituted methacrylamides, wherein the substituent is a non-interfering substituent as previously defined; styrenes; esters of maleic and fumaric acid; cross-linkers, such as glycol dimethacrylate and divinylbenzene; and others. Depending on the application, these monomers may suitably be employed with or without the addition of a polymer and/or one of the monomers may be used in a high molecular form.

The invention may be better understood with reference to the accompanying examples, which are intended for purposes of illustration only and should not be construed as in any sense limiting the scope of the invention which is defined in the claims appended hereto.

EXAMPLE 1

Preparation of (1-Methyl-2-hydroxy)propyl methacrylate [2,3-butanediol monomethacrylate]

In a first synthetic approach, twenty grams 2,3-butanediol (0.222 mol) and 35.15 g pyridine (0.444 mol) were combined with 30 mg hydroquinone (or its monomethyl ether). Then 37.64 g methacrylic anhydride (0.244 mol) were added dropwise over 30 minutes. The flask was stoppered and the reaction mixture allowed to stir overnight at room temperature. The solution was then stirred at 40° C. for 5 hours or left to stand at room temperature for several days. Ether (50 ml) was added, the solution washed with water and then neutralized with hydrochloric acid to remove the remaining pyridine. The ether solution was dried with $MgSO_4$ and filtered, and the ether removed to leave the crude monomer mixture. The monomer was dissolved in 50 ml 70/30 MeOH/$H_2O$ and washed with pentane to remove the 2,3-butanediol dimethacrylate. Some monomethacrylate was lost in this process (as the monomethacrylate is also soluble in pentane), but removal of the dimethacrylate was achieved. The methanol was removed with rotary evaporator and 50 ml 5% NaCl solution was added to monomer. This salt solution was extracted with $CH_2Cl_2$, the organic phase dried with $MgSO_4$ and filtered, the $CH_2Cl_2$ removed, and the monomer purified by vacuum distillation in the presence of CuCl(I), bp=35–36° C./70 μHg. The yield from this method was 25–29%. Better efficiency of dimethacrylate removal was achieved by shaking the monomer twice with perfluoroheptane (PCR, Inc.) instead of pentane, which removed virtually all dimethacrylate and far less monomethacrylate (monitored by GC). NMR δ(ppm): 1.2–1.3 (m, 6, —CH(C$\underline{H}_3$)—CH(OH)—C$\underline{H}_3$), 1.96(s, 3, $CH_2$=C—C$\underline{H}_3$), 2.2 (s, 1,—O$\underline{H}$), 3.75–3.85 (m, 1, OH—C$\underline{H}$—), 4.8–4.9 (m, 1, —C(O)—O—C$\underline{H}$—), 5.6, 61. (s, s, C$\underline{H}_2$=C—).

In an alternate approach, reagents were added to a 100 ml round-bottomed flask in the following order: 0.224 g 2,6-di-tert-butyl-4-methylphenol (butylated hydroxytoluene) (0.001 mol), 27.0 g 2,3-butanediol (0.3 mol), 20 ml benzene, 10.0 g methacrylic acid (0.12 mol), 1.0 g p-benzoquinone (0.009 mol), 0.4 g p-toluenesulfonic acid monohydrate (p-TSA) (0.0021 mol), and approximately 30 ml benzene (enough to fill flask). The mixture was refluxed with a Dean-Stark trap (oil bath at 100– 110° C.) until approximately 1.5 ml of water was collected. The solution was cooled, 100 ml ether added, and the reaction solution was washed once with 100 ml 1N sodium carbonate solution, and then with 2% NaOH/2% NaCl until the aqueous layer was colorless (about 300 ml). The organic layer was dried with $MgSO_4$, the solution filtered, and the solvent removed by rotary evaporation. The organic layer containing the monomer was then added to 100 ml 70/30 methanol/water and washed with pentane (5×50 ml). The remainder of the purification proceeded as described above. The yield was approximately the same as above (26–27%).

EXAMPLE 2

Preparation of 4-(N,N-dimethylamino)phenethyl methacrylate

This monomer was synthesized in a manner analogous to the published method used for the synthesis of 4-(dimethylamino)benzyl methacrylate. Thus, 4.55 g (0.0435 mol) methacryloyl chloride in 4.55 g benzene was added dropwise to a solution of 5.0 g (0.03 mol) 4-dimethylaminophenethyl alcohol, 3.64 g (0.036 mol) triethylamine, and 8.7 g benzene in the presence of p-benzoquinone and CuCl(I) with stirring and cooling, keeping the temperature below 15° C. The reaction mixture was left to stir for one hour in a room temperature water bath (about 25° C.). The solution was filtered to remove triethylamine hydrochloride. The benzene filtrate was washed with water and then with saturated sodium carbonate solution, dried over sodium sulfate anhydrous, filtered, and the benzene removed with the rotary evaporator (water bath 20–25° C.). The monomer was distilled in vacuo in the presence of CuCl(I) and 2,2-diphenyl-1-picrylhydrazyl (DPPH), bp=115–122° C./95–100, $\mu$Hg. The monomer was recrystallized from petroleum ether, mp=42–43° C. The analysis for nitrogen showed 5.86% N (calc. 6.00). NMR $\delta$(ppm): 1.9 (s, 3, $CH_2=C(CH_3)$—); 2.8 (m, 2, —$CH_2$—C$H_2$—$C_6H_4$—); 2.9 (s, 6, C$H_3$)$_2$); 4.2–4.3 (m, 2, —(O)C—O—CC$H_2$—$CH_2$—); 5.5, 6.1 (d, s, 2, C$H_2$=C); 6.7, 7.1 (d, d, 4, aromitic H).

EXAMPLE 3

Preparation of 1,10-decanedicarboxylic acid, bis[4-(N,N-dimethylamino)phenethyl ester]

This dimeric amine compound was synthesized via the reaction of 4-(N,N-dimethylamino)phenethanol (0.30 mol) with dodecanedioyl dichloride (0.015 mol) in pyridine (0.033 mol). Upon addition of the dichloride to the alcohol/pyridine solution, the reaction mixture formed a cake. Benzene (approximately 20 ml) was added to facilitate stirring. The reaction was stirred overnight at room temperature with the flask covered in aluminum foil. The reaction mixture was then heated for 6 hours at 40° C. Diethyl ether (20 ml) was added and the solution washed exhaustively with water to remove the pyridine and pyridine salts. The organic phase was dried with $MgSO_4$ and filtered, the solvent removed, and the amine recrystallized from ethanol, mp=65° C. NMR $\delta$(ppm): 1.26 (s, 16, —$CH_2$ ($CH_2$)$_8$—$CH_2$—); 2.2–2.3 (m, 4, —O—C(O)—C$H_2$—($CH_2$)$_8$—); 2.7–2.8 (m, 4, —$C_6H_4$—C$H_2$—$CH_2$—O—C(O)—); 2.9 (s, 12, N(C$H_3$)$_2$); 4.19–4.26 (m, 4, —$C_6H_4$—$CH_2$—C$H_2$—O—C(O)—); 6.7–6.8~7.0–7.1 (d, d, 8, aromatic H).

EXAMPLE 4

Preparation of Bis(2-(phenethyl)benzoyl) peroxide

2-Bibenzylcarboxylic acid chloride was prepared from 2-bibenzylcarboxylic acid and thionyl chloride according to the literature procedure, and was purified by vacuum distillation (bp=94–96° C./80 $\mu$Hg). The peroxide was then synthesized in a manner similar to the synthesis of dibenzoyl peroxide. 0.05 mol 2-bibenzylcarboxylic acid chloride was dissolved in 13 ml acetone and added dropwise to a solution of 50 g ice water, 50 g ice, and 0.1 mol sodium peroxide with stirring and cooling to below 10° C. The solution was stirred for another hour, the crude peroxide filtered off, and the peroxide recrystallized from chloroform/methanol, mp=81–82° C. NMR $\delta$(ppm): 2.9–3.0, 3.2–3.3 (m, m, 8, —C$H_2$—C$H_2$—), 7.4–7.6, 7.9–8.0 (m, m, 18, aromatic H).

EXAMPLE 5

Preparation of Bis(4-(phenethyl)benzoyl) peroxide

This peroxide was synthesized from the corresponding acid chloride and sodium peroxide. First, 4-bibenzylcarboxylic acid chloride was prepared from 4-bibenzylcarboxylic acid and thionyl chloride (see the synthesis of 2-bibenzylcarboxylic acid chloride above). The acid chloride was purified by vacuum distillation (bp=104–106° C./120–130, $\mu$Hg), and solidified upon cooling. The synthesis of the peroxide was performed with NaOH/$H_2O_2$ and the acid chloride in tetrahydrofuran. Here, 12.0 ml 30% $H_2O_2$ was added to 4.8 g NaOH in 30.0 ml $H_2O$ and the solution cooled to 5° C. A solution of 2.0 g 4-(phenethyl)benzoyl chloride in 2.0 ml tetrahydrofuran was then added and the reaction mixture stirred for one hour. The crude peroxide was filtered off and recrystallized from chloroform/methanol, mp=145° C. (decomp.). The yield was 41%. The peroxide proved to be quite insoluble in common solvents, except for chloroform and large amounts of benzene. NMR $\delta$(ppm): 2.9–3.0 (m, 8, —$CH_2$—$CH_2$—), 7.1–7.3, 7.9–8.0 (m, m, 18, aromatic H).

EXAMPLE 6

Preparation of Bis(4-n-octyl)benzoyl peroxide

The peroxide was synthesized by the procedure according to Example 5 from 4-(n-octyl) benzoyl chloride using the same relative amounts and conditions. The crude peroxide was filtered off and recrystallized from toluene, m.p. 75° C. The peroxide is soluble in most organic solvents.

EXAMPLE 7

Copolymerization of Methyl Methacrylate with 4-(N,N-Dimethyl)aminostyrene and 4-(N,N-Dimethylamino)phenethyl Methacrylate These copolymers are prepared for use as polymeric amine accelerators. A copolymer of methyl methacrylate (MMA) and 4-dimethylaminostyrene (DMAS) was prepared in a 3:1 ratio of MMA to DMAS: 1.0 g DMAS, 2.38 g MMA, 0.018 g methyl azoisobutyrate, and 3.0 g toluene were mixed, the flask flushed with nitrogen, and heated at 60–70° C. The polymer was precipitated in 1000 ml petroleum ether, filtered and dried.

EXAMPLE 8

Polymerization of MMA and MMA/PMMA Slurries

Zimmer LVC powder (containing 10% w/w $BaSO_4$) was chosen for ease of handling. Polymer powder without benzoyl peroxide was prepared by stirring Zimmer LVC powder in methanol several times to extract the peroxide until only traces of peroxide were detected iodometrically.

Polymerizations of methyl methacrylate (MMA) were performed with varying initiation systems to determine the effect of initiation on the exothermic properties, namely the peak temperature ($T_{max}$) and time to reach peak temperature ($t_{max}$). For each polymerization, 1.0 g MMA (with 65 ppm MEHQ inhibitor) was placed in a polypropylene vial, the amine accelerator added, and the solution thoroughly mixed. The peroxide was then added, the chart recorder turned on, the solution mixed thoroughly, the vial was briefly flushed with nitrogen, the temperature probe inserted, and the temperature vs. time recorded with a chart recorder. From this recording, the peak temperature and time to peak temperature were determined. The concentration of peroxide used was 4% w/w based on methyl methacrylate monomer. The amount of amine used depended on its structure. Amines with one dimethylamino group were used in equimolar ratios of amine to peroxide. Those with two dimethylamino groups were used in a ratio of 0.5:1 amine:peroxide. It was found that 4PEBPO is only slightly soluble in MMA. However, polymerizations with this peroxide were performed in a slurry with PMMA to prove its initiating capability.

The amines and peroxides (with their abbreviations) used in these experiments were the following:

| Amines: | N,N-dimethyl-p-toluidine | DMpT |
|---|---|---|
| | bisdimethylaminodibenzyl | bisDMADB |
| | N,N-dimethylaminobiphenyl | DMAbiphenyl |
| | 4-(N,N-dimethylamino)phenethanol | DMAPEtOH |
| | 4-(N,N-dimethylamino)phenylacetic acid | DMAPAA |
| | methylenebis(dimethylaniline) | MebisDMA |
| | 1,12-decanedicarboxylic acid, bis(4-(N,N-dimethylamino)phenethyl ester) | $C_{12}$Dimer |
| | N,N-dimethylaniline | |
| | N,N-dimethyl-p-tert-butyl-aniline | |
| | N,N-dimethyl-p-isopropyl-aniline | |
| | β-p-(N,N-dimethylamino)phenyl propionic acid | |
| | α-p-(N,N-dimethylamino)cinnamic acid | |
| | N,N-bis(2-hydroxypropyl)-p-toluidine | |
| | N,N,N,N-tetramethyldiaminodiphenylmethane | |
| | benzylidinebis(n,N-dimethylaniline) | |
| | 4-(N,N-dimethylamino)styrene | DMAS |
| | 4-(N,N-dimethylamino)phenethyl methacrylate | DMAPEMA |
| | poly(methyl methacrylate-co-4-(N,N-dimethylamino)styrene) | PMMADMAS |
| | poly(methyl methacrylate-co-4-(N,N-dimethylamino)phenethyl methacrylate) | PMMADMAPEMA |
| Peroxides: | dibenzoyl peroxide | BPO |
| | bis(2-phenethyl)benzoyl peroxide | 2PEBPO |
| | bis(4-phenethyl)benzoyl peroxide | 4PEBPO |
| | bis(4-n-octyl)benzoyl peroxide | 4OBPO |

The polymerization characteristics of monomer/polymer slurries differ from those of bulk polymerization of the monomer only. Therefore, methyl methacrylate/poly(methyl methacrylate) slurries were polymerized with various initiation systems to determine the peak temperature and time to peak temperature. Polymerizations of monomer/polymer slurries of MMA/PMMA were carried out with 2 parts polymer powder and 1 part MMA monomer with varying molar quantities of amine and peroxide (except in the commercial cement preparations which were used as provided).

The amines used in these experiments were N,N-dimethyl-p-toluidine (DMpT), 1,12-decanedicarboxylic acid, bis(4-(N,N-dimethylamino)phenethyl ester) ($C_{12}$Dimer), poly(methyl methacrylate-co-4-(N,N-dimethylamino)styrene) (PMMADMAS), poly(methyl methacrylate-co-4-(N,N-dimethylamino)phenethyl methacrylate) (PMMADMAPEMA), 4-(N,N-dimethylamino)phenethyl methacrylate (DMAPEMA), and bisdimethylaminodibenzyl (bisDMADB). The peroxides utilized were dibenzoyl peroxide (BPO), bis(2-(phenethyl) benzoyl) peroxide (2PEBPO), bis(4-(phenethyl)benzoyl) peroxide (4PEBPO), and bis(4-n-octyl)-benzoyl peroxide (4OBPO).

For polymerizations with soluble peroxides, the peroxide and polymer powder were stirred in ether, and the ether removed to give adequate distribution of the peroxide in the powder. The dissolution of bis[4-(phenethyl)benzoyl] peroxide in a polymer without solvent was not possible, so the polymer powder and peroxide were simply mixed in a mortar and pestle.

EXAMPLE 9

Polymerization of PMMA Powder with Comonomers

Various monomer compositions in the standard ratio of 1 part monomer to 2 parts polymer powder were studied. It was found that compositions of 70/30 EMA/HEMA, 50/50 EMA/MHPrMA and 50/50 n-PrMA/MHPrMA exhibited a water uptake close to the 5% targeted.

Zimmer LVC polymer powder with or without BPO was used in all experiments. The mixing properties of these comonomers with the PMMA powder were first tested. The 70/30 EMA/HEMA dissolved the powder quite readily in about 3 minutes. All other monomer compositions required a longer time for the mixture to become workable. A preparation of 50/50 EMA/4HBMA was also made for comparison of water uptake and mechanical properties of the copolymers.

The water uptake of homopolymers and copolymers comprising various proportions of higher boiling and hydrophilic monomers was measured at room temperature or at 37° C.

The results of the water uptake of specimens used for measurement of mechanical properties are presented in Table 1. The copolymers prepared with the PMMA powder were shown to attain approximately the 5% water uptake which was considered necessary for use of in acrylic orthopaedic materials (as it corresponds to the shrinkage due to conversion of the monomer into the polymer).

TABLE 1

Water uptake of slurries of PMMA powder and given (co)monomers.

| Composition | Water Uptake (%) After one week |
|---|---|
| 50/50 EMA/MHPrMA | 4.5 |
| 58/42 MPHrMA/nPrMA | 4.4 |
| 50/50 EMA/4HBMA | 5.0 |
| 70/30 EMA/HEMA | 5.0 |

EXAMPLE 10

Preparation and Evaluation of Polymer Products

Time vs. temperature measurements were recorded for the polymerizations of the monomer/polymer slurries. The amine and monomer were mixed together thoroughly, added to the polymer powder containing the peroxide, and the chart recorder turned on. The slurry was stirred until visibly homogeneous, then transferred to a 4 ml polypropylene vial (11 mm internal diameter), the temperature probe inserted and the data recorded. From these data, the peak temperature ($T_{max}$) and time to peak temperature ($t_{max}$) were determined.

Polymers containing hydrophilic and higher boiling monomers were prepared by thermal bulk polymerization as described. Slurries composed of PMMA powder with these comonomers were initiated by the DMpT/BPO system in polypropylene vials. The polymers were released from the vials and thin slices (0.5–0.6 mm thickness) cut from center of cylinders with a Buehler Isomet™ Low Speed Saw. The discs were then polished with a Buehler Minimet Polisher and a polishing compound composed of mineral oil and 0.3 $\mu$ alpha alumina Buehler Micropolish.

The polymer discs prepared above were soaked in water at a specified temperature for a certain time period, the discs weighed (hydrated weight), dried for at least 8 hours in a vacuum over (20 mmHg) at 100° C., weighed again (dehydrated weight), and the water uptake calculated from the following formula:

% water=[(hydrated weight−dehydrated weight)/hydrated weight]·100.

Acrylic polymer specimens prepared with new initiation systems were soaked in aqueous solution to determine the ability of the initiator components to leach out of the polymer network. Polymer discs were produced by the polymerization of MMA or MMA/PMMA slurries with various initiation systems in polypropylene vials. After curing, the cylindrical polymer specimen was removed from the vial and cut into discs of 0.5–0.6 mm thickness as described above. The discs were then soaked in water and the soaking solutions monitored for leaching of the initiation system components spectrophotometrically at specified times over a one month period. Methyl methacrylate was the monomer used in all preparations. The following initiatory systems were studied: Zimmer LVC (DMpT/BPO), DMpT/2PEBPO, $C_{12}$Dimer/2PEBPO. Absorbance of residual methyl methacrylate monomer necessitated the use of MMA in the reference solution. The amount was adjusted for each sample such that the MMA peak was neither strongly positive or negative.

The extraction of products out of polymer samples prepared with the following initiator systems were studied: Zimmer LVC (DMpT/BPO), DMpT/2PEBPO, $C_{12}$Dimer/BPO, $C_{12}$Dimer/2PEBPO. The soaking solutions were monitored by UV spectrophotometer for one month. After one day all polymers showed some leaching due to compounds residing on the surface. Thereafter, no leaching was seen for the amines and acids with large substituents. Benzoic acid and small amounts of amine leached out of the polymers prepared by using BPO and DMpT.

Conversion measurements reflect the polymerization efficiency as they determine how much monomer is converted to polymeric form. Higher conversion indicates that less residual monomer is present in the cured material. The conversion of monomer to polymer was measured for a few formulations. The polymers were prepared in vials as above, cut into discs, weighed, placed in vacuum oven at 80° C. overnight, and weighed again. Conversion was calculated as:

% conversion=[(initial weight−dried weight)/initial weight]·100.

The exotherms and conversions for various compositions are presented in Table 2. Compressive strength testing of polymer samples was performed according to ASTM Standard Specification for Acrylic Bone Cement F451-86, the only standardized testing protocol for acrylic bone cement. Specimens were prepared in a stainless steel mold with 7 cylindrical holes of 6 mm in diameter and 12 mm in height. The mold was clamped between two thick glass plates during curing. A silicone release agent was used to facilitate removal. The polymers were prepared by vacuum mixing in a custom-made vacuum chamber equipped with a hand-turned mechanical stirrer. The slurries were stirred under a vacuum of approximately 20 mm Hg for 45 seconds, then placed in the mold. After one hour the specimens were removed from the mold, soaked in distilled water at 37° C. for one week, and tested for their compressive strength.

Test specimens with various comonomer compositions (EMA/HEMA, EMA/MHPrMA, nPrMA/MHPrMA) were prepared as follows: The comonomers were mixed with the Zimmer LVC PMMA powder containing the benzoyl peroxide and left standing until the polymer powder dissolved and formed a viscous paste. A small amount of monomer containing the amine accelerator (DMpT) was then mixed thoroughly into the paste, degassed under vacuum, and placed in the mold. After 1 hour of curing the specimen were removed from the molds and soaked in water at 37° C. for one week. The percentages of water uptake of the specimens prepared with hydrophilic comonomers were measured after one week.

Testing was performed on a Matco mechanical testing machine with a crosshead speed of 20 mm/min. Data were acquired for compressive load (Newtons) divided by the calculated initial cross-sectional area (mm) of the specimen and reported to the nearest megaPascal (MPa). The failure load was determined as the ultimate load, the yield load, the yield load at 2% offset, or fracture, whichever came first.

The compressive strengths of the various polymer and copolymer specimen tested according to the ASTM protocol for acrylic bone cements are given in Table 3. Strengths are given as averages with the standard deviation in parenthesis. As expected, the cured hydrated materials containing 4HBMA have lower compressive strengths than cements containing MMA. The cements containing MHPrMA tended to have higher strengths than those with HEMA, but were of slightly lower strengths than MMA alone.

While there have been shown and described the fundamental novel features of the invention, it will be understood that various omissions, substitutions and changes in the form and details illustrated may be made by those skilled in the art without departing from the spirit of the invention. It is the intention, therefore, to be limited only as indicated by the scope of the following claims.

TABLE 2

Exotherm and Conversion

| | Ratio | $T_{max}$ | $t_{max}$ | Conversion 24 hrs. |
|---|---|---|---|---|
| DMpT:BPO | 3:1 | 68 | 17 | 93–94 |
| DMpTBPO | 1:1 | 66 | 11 | 96–97 |
| BisDMpT:BPO | 0.5:1 | 70 | 12 | 96–97 |
| $C_{12}$DIMER:BPO | 0.5:1 | 61 | 20 | 96–97 |
| POLY:BPO | 1:1 | 43 | 38 | 97–98 |
| POLY:BPO | 3:1 | 50 | 17 | 97–98 |
| POLY:4OBPO | 0.5:1 | 60 | 20 | 97–98 |
| DMpT:2PEBPO | 0.5:1 | 81 | 10 | less than 96 |
| DMpT:4PEMPO | 0.5:1 | 42 | 40 | proceeded |

TABLE 2-continued

| | Exotherm and Conversion | | | |
|---|---|---|---|---|
| | Ratio | $T_{max}$ | $t_{max}$ | Conversion 24 hrs. |
| POLY:2PEBPO | 0.5:1 | 76 | 4 | less than 96 |
| POLY:4PEBPO | 0.5:1 | 38 | 58 | proceeded |

TABLE 3

Compressive strengths of polymer samples after 1 week in water at 37° C.

| Monomer | Amine | Peroxide | % Peroxide | Molar Ratio | Vacuum or Hand Mixed | Number of Specimen | Compressive Strength (MPa) |
|---|---|---|---|---|---|---|---|
| MMA | DMpT | BPO | 1.5 | 3:1 | HM | 5 | 87 (7.2) |
| MMA | DMpT | BPO | 1.5 | 3:1 | VM | 7 | 98 (2.4) |
| MMA | DMpT | BPO | 1.5 | 1:1 | VM | 6 | 99 (2.3) |
| MMA | $C_{12}$Dimer | BPO | 1.5 | 0.5:1 | VM | 6 | 100 (5.5) |
| MMA | bisDMADB | BPO | 1.5 | 0.5:1 | VM | 7 | 103 (2.6) |
| MMA | PMMADMAS | BPO | 1.5 | 2:1 | VM | 7 | 95 (4.6) |
| MMA | DMAPEMA | BPO | 1.5 | 1:1 | VM | 4 | 95 (3.0) |
| MMA | PMMADMAS | 2-PEBPO | .5 | 1:1 | VM | 7 | 52 (3.3) |
| MMA | DMpT | 4-PEBPO | 1.5 | 1:1 | VM | 6 | 65 (2.8) |
| MMA | DMpT | 4-OBPO | 1.5 | 1:1 | VM | 6 | 100 (3.6) |
| EMA/HEMA 70:30 | DMpT | BPO | 1.5 | 1:1 | VM | 6 | 82 (1.3) |
| nPrMA/MHPrMA 42:58 | DMpT | BPO | 1.5 | 1:1 | VM | 6 | 85 (2.3) |
| EMA/MHPrMA 50:50 | DMpT | BPO | 1.5 | 1:1 | VM | 4 | 90 (4.8) |
| EMA/4HBMA 50:50 | DMpT | BPO | 1.5 | 1:1 | VM | 7 | 50 (1.4) |

What is claimed is:

1. An initiator system for polymerization of monomer mixtures, the initiator system comprising a diacyl peroxide and a tertiary amine, wherein the peroxide has higher molecular weight than BPO, the peroxide being selected from the group consisting of diacyl peroxides in which each acyl group comprises substituents equivalent to at least about an additional 8 carbon atoms relative to the phenyl group of benzoyl peroxide and polydiacyl peroxides.

2. An initiator system in accordance with claim 1, wherein the peroxide is selected from the group consisting of substituted derivatives of benzoyl peroxide, aliphatic peroxides and cycloaliphatic peroxides.

3. An initiator system in accordance to claim 1, wherein the substituents equivalent to at least about 8 carbon atoms are selected from the group consisting of aryl, aralkyl, (aralkyl)aryl, alkyl and cycloalkyl.

4. An initiator system in accordance with claim 1, wherein the peroxide is a polydiacyl peroxide.

5. An initiator system for polymerization of monomer mixtures, the initiator system comprising a diacyl peroxide and a tertiary amines, wherein the tertiary amine has higher molecular weight than DmpT, the tertiary amine being selected from the group consisting of dialkylarylamines in which the substituent on the aryl group is equivalent to at least 9 carbon atoms and amine dimers comprising two amino-substituted aromatic rings connected together by a spacer group equivalent in size to 1 to about 40 carbon atoms.

6. An initiator system in accordance with claim 1, wherein the diacyl peroxide is selected from the group consisting of bis(2-phenethyl)benzoyl peroxide, bis(4-phenethyl)benzoyl peroxide and bis(p-octyl)benzoyl peroxide.

7. An initiator system of claim 1, wherein the tertiary amine has higher molecular weight than DmpT, the tertiary amine being selected from the group consisting of dialkylarylamines in which the substituent on the aryl group is equivalent to at least 9 carbon atoms and amine dimers comprising two amino-substituted aromatic rings connected together by a spacer group equivalent in size to 1 to about 40 carbon atoms.

8. An initiator system for polymerization of monomer mixtures, the initiator system comprising a diacyl peroxide and a polyamine having increased molecular weight relative to DMpT.

9. The initator system of claim 8, wherein the peroxide has higher molecular weight than BPO, the peroxide being selected from the group consisting of diacyl peroxides in which each acyl group comprises substituents equivalent to at least about an additional 8 carbon atoms relative to the phenyl group of benzoyl peroxide and polydiacyl peroxides.

10. The initator system of claim 8, wherein the polyamine is selected from the group of polymeric amines comprising copolymers of amine-containing dialkylarylamine monomers.

11. An initiator system for polymerization of monomer mixtures, the initiator system comprising a diacyl peroxide and a tertiary amine, wherein the peroxide has higher molecular weight than BPO, the peroxide being selected from the group consisting of substituted derivatives of benzoyl peroxide, aliphatic peroxides and cycloaliphatic peroxides in which said substituents are equivalent to at least about an additional 8 carbon atoms relative to the phenyl group of benzoyl peroxide and polydiacyl peroxide.

12. An initiator system for polymerization of monomer mixtures, the initiator system comprising a diacyl peroxide and a tertiary amine, wherein the peroxide has higher molecular weight than BPO, the peroxide being selected from the group consisting of bis(2-phenethyl)benzoyl peroxide, bis(4-phenethyl)benzoyl peroxide, bis(p-octyl) benzoyl peroxide, polyperphthaloyl peroxide and polyacroylbenzoyl peroxide, having substituents selected from the group consisting of alkyl or cycloalkyl groups comprising at least about 10 carbon atoms, said tertiary amine being selected from the group consisting of bis dimethylaminodibenzyl, methylenebis(dimethylaniline), 1,12-decanedicarboxylic acid, bis(4-(N,N-dimethylamino) phenethyl ester), and N,N,N,N-tetramethyldiamniodipheylmethane benzylidinebis(N, N-dimethylniline).

13. An initiator system for polymerization of monomer mixtures, the initiator system comprising a diacyl peroxide and a polyamine having increased molecular weight relative to DMpT, said peroxide having higher molecular weight than BPO, the peroxide being selected from the group consisting of diacyl peroxides in which each acyl group comprises substituents equivalent to at least about an additional 8 carbon atoms relative to the phenyl group of benzoyl peroxide and polydiacyl peroxides, said polyamine being selected from the group of polymeric amines comprising copolymers of amine-containing dialkylarylamine monomers.

* * * * *